INVENTORS
Garland K. Grace
Robert H. Brown

INVENTORS
Garland K. Grace
Robert H. Brown

July 18, 1967        G. K. GRACE ETAL        3,331,723
SLIVER INSERTER FOR SOLID PROPELLANT ROCKET MOTORS
Filed July 31, 1963                                 5 Sheets-Sheet 5

INVENTORS
Garland K. Grace
Robert H. Brown
BY

United States Patent Office 3,331,723
Patented July 18, 1967

3,331,723
SLIVER INSERTER FOR SOLID PROPELLANT
ROCKET MOTORS
Garland K. Grace and Robert H. Brown, Huntsville, Ala., assignors to Thiokol Chemical Corporation, Bristol, Pa., a corporation of Delaware
Filed July 31, 1963, Ser. No. 299,038
6 Claims. (Cl. 156—423)

This invention relates to improvements in sliver inserters that are adapted to insert inert slivers into the motor case of a solid propellant rocket motor before the uncured propellant is cast or loaded therein.

It is, at the present time, conventional practice to provide a central cavity or configuration in the uncured propellant that is cast or loaded into the motor case of a solid propellant rocket motor. As described in Patent 2,987,882, the burning of the solid propellant is affected by the residue of the solid propellant that remains in the motor case during the burnout period. The residue is often referred to as slivers; and to prevent the effect of the burnout of the propellant slivers on the thrust of the solid propellant rocket motor, inert slivers are bonded to the interior surface of the motor case before the uncured propellant is cast therein. These slivers, being of an inert material, do not burn as do the propellant slivers and thus do not affect the thrust of the solid propellant rocket motor as do the propellant slivers.

The inert slivers, however, must be properly positioned in the motor case so that they will coincide with the location of the propellant slivers and thus replace them during the burnout period of the solid propellant rocket motor. Due to the size of the motor case and the configuration thereof, the inert slivers cannot be positioned therein by hand; and some means must be provided that will properly position the inert slivers in the motor case and can be easily and properly handled from the exterior of the motor case.

It is an object of this invention, therefore, to provide a sliver inserter that can properly position and properly orient the inert slivers in a motor case and retain them in proper position until the are bonded to the interior surface of the motor case and then be withdrawn from the motor case after the inert slivers have been bonded to the interior surface of the motor case.

A sliver inserter to be suitable for such a procedure must be simple in construction and as nearly trouble-free as possible in operation. The sliver inserter must be constructed of components that are not too heavy or bulky to be handled by a single operator or individual. Because of the fast-drying bonding material or adhesive that is used to bond the inert slivers in position, the sliver inserter must be able to be inserted quickly into the motor case so that the inert slivers can be coated with the bonding material or adhesive on the outside of the motor case and then be quickly placed in position before the bonding material dries out and will not properly bond the inert slivers to the interior surface of the motor case. The sliver inserter must be capable of accurately locating the inert slivers in the motor case; and, most important of all, the sliver inserter must be able to be varied in diameter to meet the interior dimensions of the motor case. Furthermore, the sliver inserter must be capable of rigidly retaining the inert slivers in proper position yet must be able to be quickly disengaged from the inert slivers when the sliver inserter is to be removed from the motor case.

The sliver inserter embodying the invention was developed to meet the requirements previously set forth and another object of the present invention was to provide such a sliver inserter.

With the above and other objects and advantages in view, the invention consists of the novel details of construction, arrangement and combination of parts more fully hereinafter described, claimed, and illustrated in the accompanying drawings in which:

Figure 1:
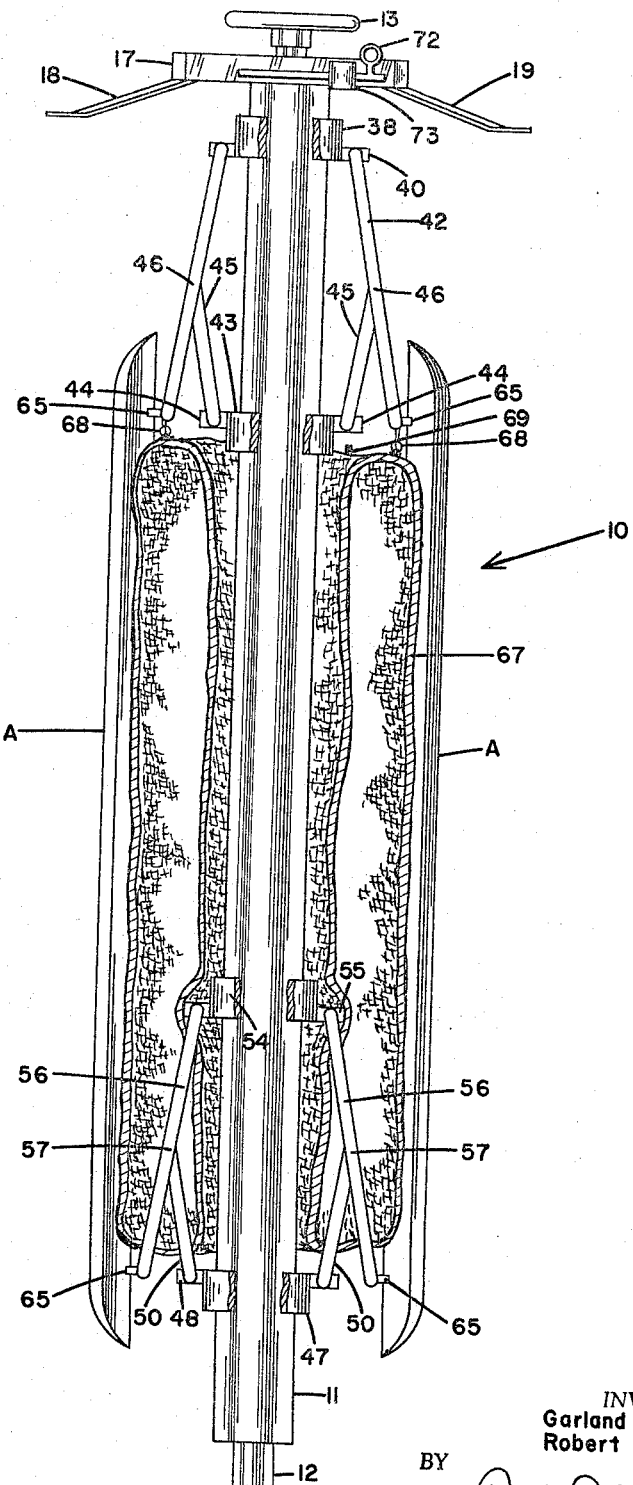
FIGURE 1 is a schematic elevational view, partly in section, of a sliver inserter embodying the invention in collapsed position.

Referring more in detail to the drawings wherein like parts are designated by like reference numerals, the reference numeral 10 is used to generally designate a sliver inserter embodying the invention.

The sliver inserter 10 comprises an elongated central tube or core 11 through which extends an actuating screw rod or shaft 12 that has keyed to the upper end thereof a handwheel 13. Press-fit into the upper end of the tube 11 is a sectional plug 14, and an annular flange 15 on the outer end of the plug 14 engages and coincides with the upper edge of the tube 11. Secured to the plug 14 by means of machine bolts 16 is an elongated, rectangular, box-like, shaped support member 17 that has a pair of support arms 18 and 19 respectively extending outwardly of the opposite ends thereof in axial alignment therewith. The member 17 has a central opening 20 therein through which the rod 12 extends to be keyed to the handwheel 13.

The plug 14 has a central cavity 21 therein, and the wall defining the cavity 21 has an annular groove 22 therein in which is positioned a bearing 23 which contacts the rod 12. A ring collar 24 press-fit onto the rod 12 engages the lower surface of the bearing 23, and an O-ring 25 on the rod 12 engages the upper surface of the bearing 23. The plug 14 has a central opening 26 through which the rod 12 extends and lubrication for the bearing 23 may also be provided by means of the opening 26.

Mounted for sliding movements within the tube 11 is a cylindrical screw block retaining member 27. The member 27 has a bore 28 to receive the screw rod 12 and an axially-lined bore 29 to receive the cylindrical screw block 30. Transverse, radially-disposed openings 31 are provided in the member 27 through which pins 32 extend to be received in radially-disposed recesses 33 in the screw block 30. Thus the member 27 and screw block 30 are retained in fixed relation to each other.

The member 27 is also provided with a plurality of radially-disposed, parallel, transversely-extending openings 34 through which pins 35 extend; and the pins 35 extend through longitudinally-extending slots 36 in the tube 11 to be received in aligned, transversely-extending openings 37 in an upper circular collar 38 that is slidably mounted on the outer surface of the tube 11. The pins 35 thus retain the member 17 and collar 38 in fixed relation to each other. Spacers or key members 39 are disposed in the slots 36 intermediate of the member 17 and collar 38 to prevent any lost motions between the member 17 and collar 38 that might be occasioned by any clearance that might exist between the pins 35 and the walls of the slots 36.

The collar 38 at one edge thereof is provided with a plurality of right-angularly disposed projections 40; and, in operation, there will be a projection for each inert sliver A that is to be positioned within a rocket motor case. Each of the projections 40 has a transversely-extending opening therein to receive a machine bolt 41 whereby linkage arms 42 are pivotally connected to the projections 40 at opposite sides thereof. Also mounted on the tube 11 in reverse relation to the collar 38 is a somewhat similar collar 43 having projections 44 thereon to which are pivotally connected linkage arms 45; and the free ends of the linkage arms 45 are pivotally connected to the linkage arms 42 at 46.

Mounted on the tube 11 in suitably-spaced relation to the collar 43 is a lower collar 47. The collar 47 is somewhat similar to collar 38 having projections 48 thereon to which are connected by machine bolts 49 linkage arms 50. Collar 47 is provided with radially-disposed, transversely-extending openings 51 which receive pins 52 which extend into transversely aligned openings 53 in the tube 11 whereby the collar 47 is connected to the tube 11 in fixed relation thereto. The collar 43 is mounted on the tube 11 in like manner to the collar 47, thus both collars are fixed to the tube 11.

Slidably mounted on the tube 11 inwardly of the collar 47 is another lower collar 54 which is mounted in reverse relation to the collar 47 to coincide with the mounting of the collar 38. Both the collars 38 and 54 are assembled in the same manner, with the collar 54 having radially-disposed projections 55 to which are pivotally connected linkage arms 56. The linkage arms 50 being pivotally connected at their free ends to the linkage arms 56 at 57 as the linkage arms 45 are connected at 46 to the linkage arms 42.

Mounted in the interior of the tube 11 and secured thereto in predetermined spaced relation to each other by means of machine bolts 58 are a plurality of adapter or guide rings 59. The rings 59 are positioned in circumjacent relation to the rod 12 by means of a central opening 60 therein, and the rings 59 serve to maintain the rod 12 in equally-spaced and aligned relation with the interior of the tube 11.

Figure 6:
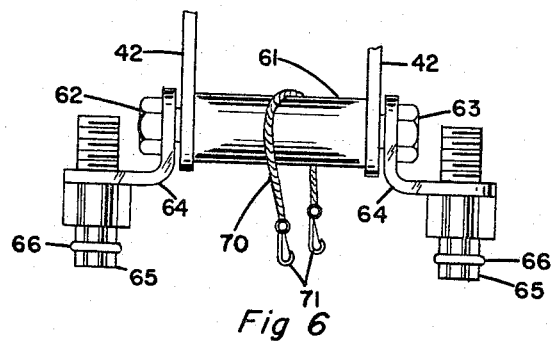
FIGURE 6 is an enlarged detailed fragmentary view of the outer ends of the linkage and the studs for connecting the inert sliver to the sliver inserter with the inflatable-bag retaining means looped thereover.

The outer or free ends of each of the linkage arms 42 and 56 are pivotally connected to an internally-threaded cylindrical spacer 61 that is positioned intermediate of the free ends thereof by means of machine bolts 62 and 63 respectively; and an ell-shaped bracket 64 is pivotally mounted on each of the machine bolts 62 and 63 as shown in FIGURE 6. A stud 65 is threadably connected to each of the brackets 64, and an O-ring 66 is positioned on each of the studs 65 in circumjacent relation thereto. The studs 65, with the O-rings 66 thereon, extend into equally-spaced openings in the opposite ends of the inert sliver A and the O-rings 66 provide a vacuum within the openings in the inert sliver A to aid in retaining the inert sliver A in fixed relation to the linkage arms 42 and 56 as the operation of the sliver inserter is carried out as will be later explained.

In the assembly of the sliver inserter 10 and the manner of its use, it is pointed out that all necessary openings and the elongated slots are provided in the tube 11 prior of the insertion of and the association therewith of the tube 11 with the other components of the sliver inserter 10 are achieved.

To assemble the sliver inserter 10, as many of the adapters 59 are to be applied to the rod 12 as is required; but such adapters must be positioned on the rod 12 so that they will not interfere with the placing of the members 27 and the blocks 30 therein on the rods 12 so that the blocks 30 will engage the threaded portion of the rod 12. It will also be understood that the sectional plug 14 will not be inserted into the tube 11 until all of the other components have been positioned in the tube 11 and the collars 38, 43, 47, and 54 have been connected to the tube 11 and the members 27, as previously described.

With the tube 12 and its component parts in collapsed position, an inflatable bag 67 resembling somewhat an oversized doughnut is positioned on the inert sliver assembly, as shown in FIGURE 1. The bag 67 has attached thereto by suitable means a plurality of rings 68 and also has an inflating valve 69 connected thereto whereby compressed air may be introduced into the bag 67.

Figure 2:
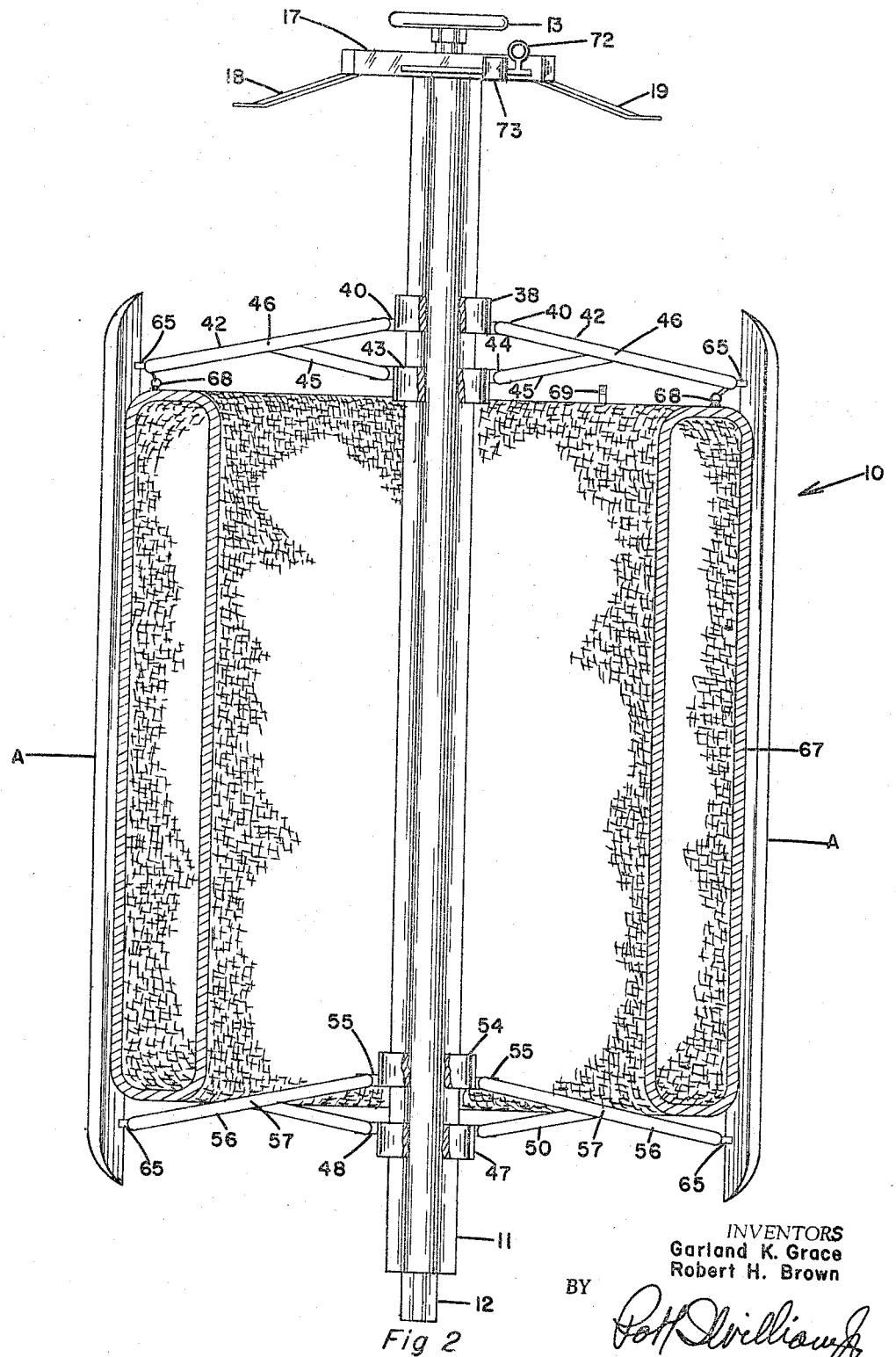
FIGURE 2 is a view similar to FIGURE 1 with the sliver inserted in expanded position.
Figure 3:
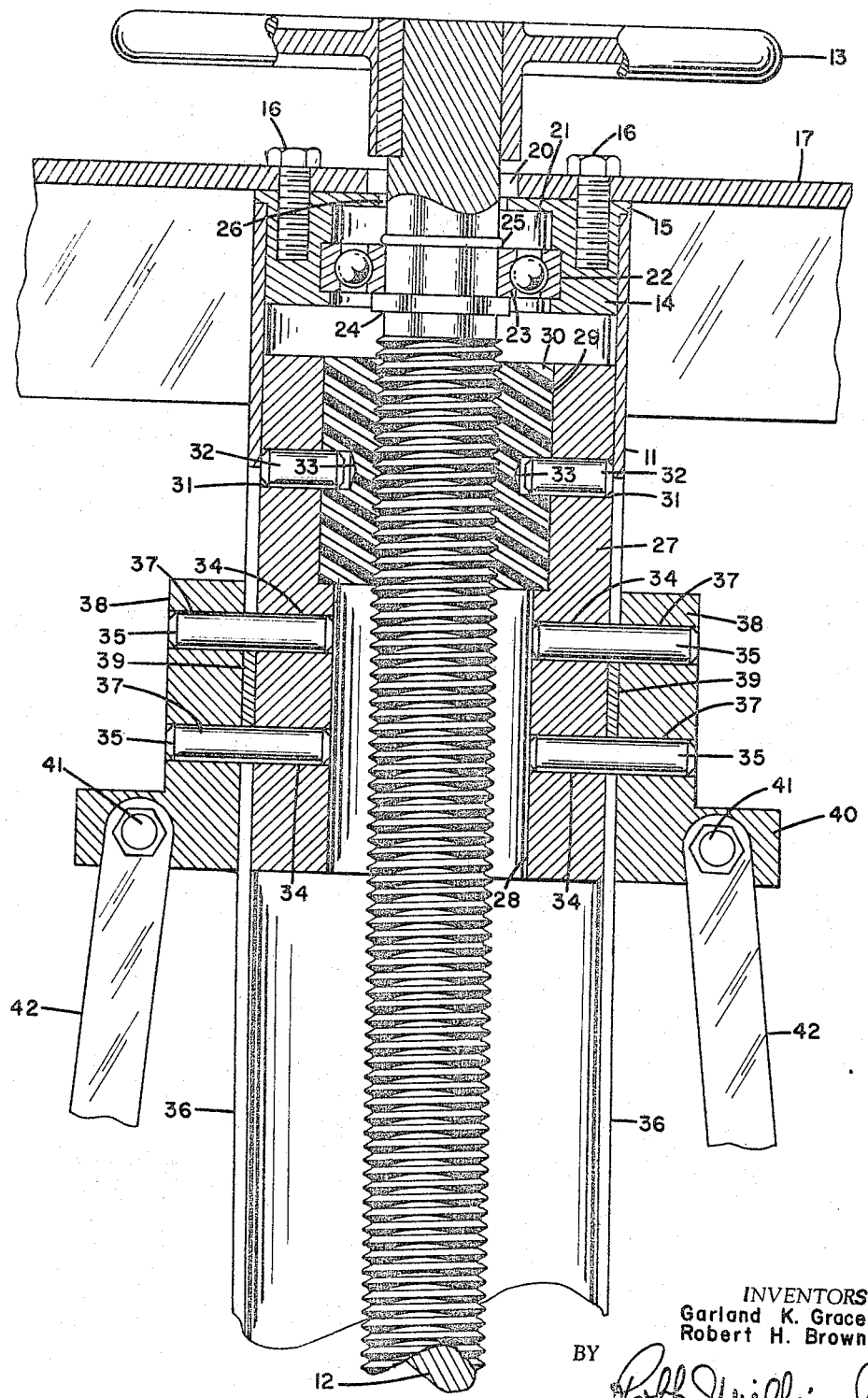
FIGURE 3 is an enlarged fragmentary detailed vertical sectional view of one of the upper linkage actuating collars.
Figure 4:
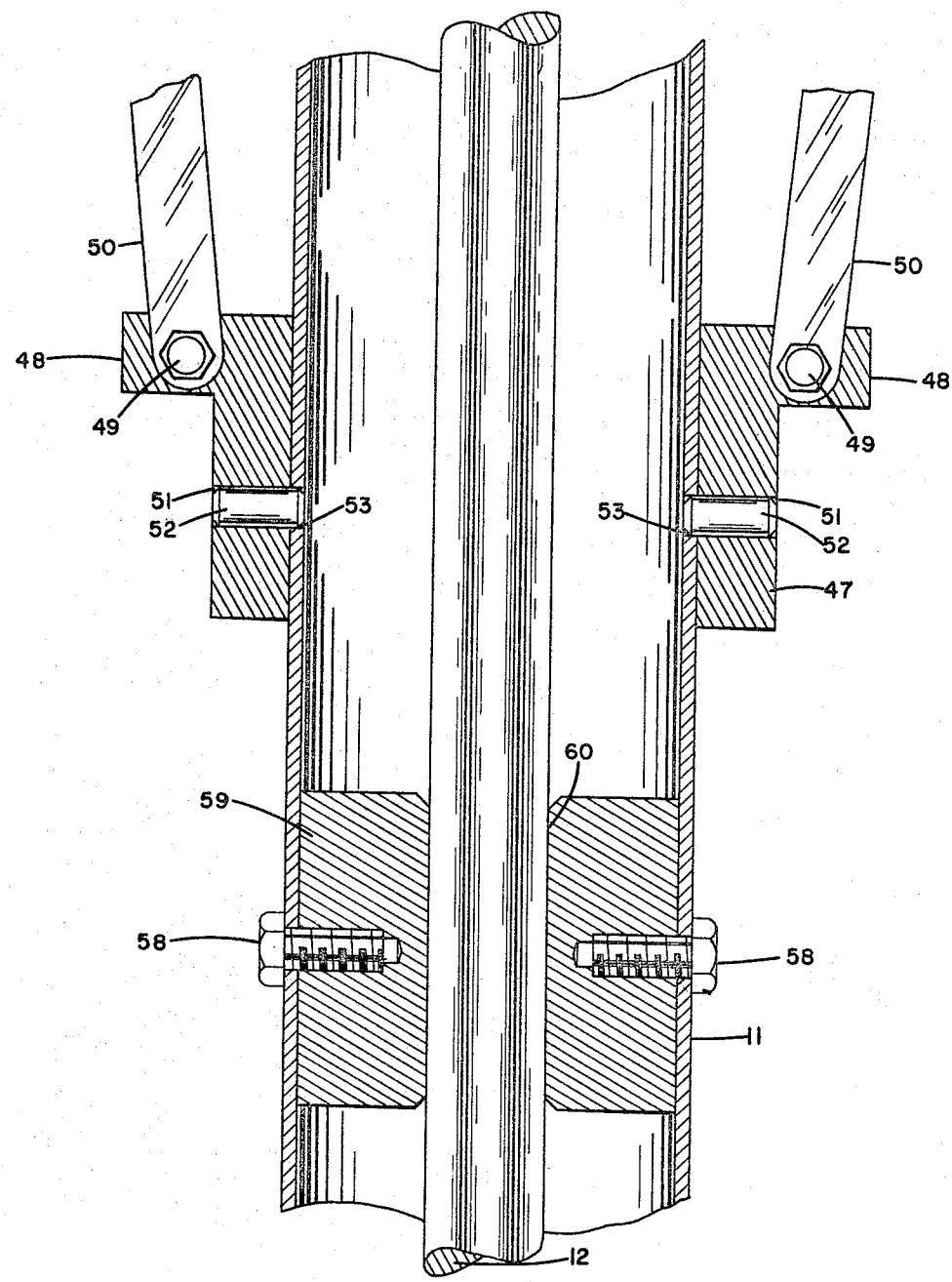
FIGURE 4 is an enlarged fragmentary detailed sectional view of one of the lower linkage actuating collars.
Figure 5:
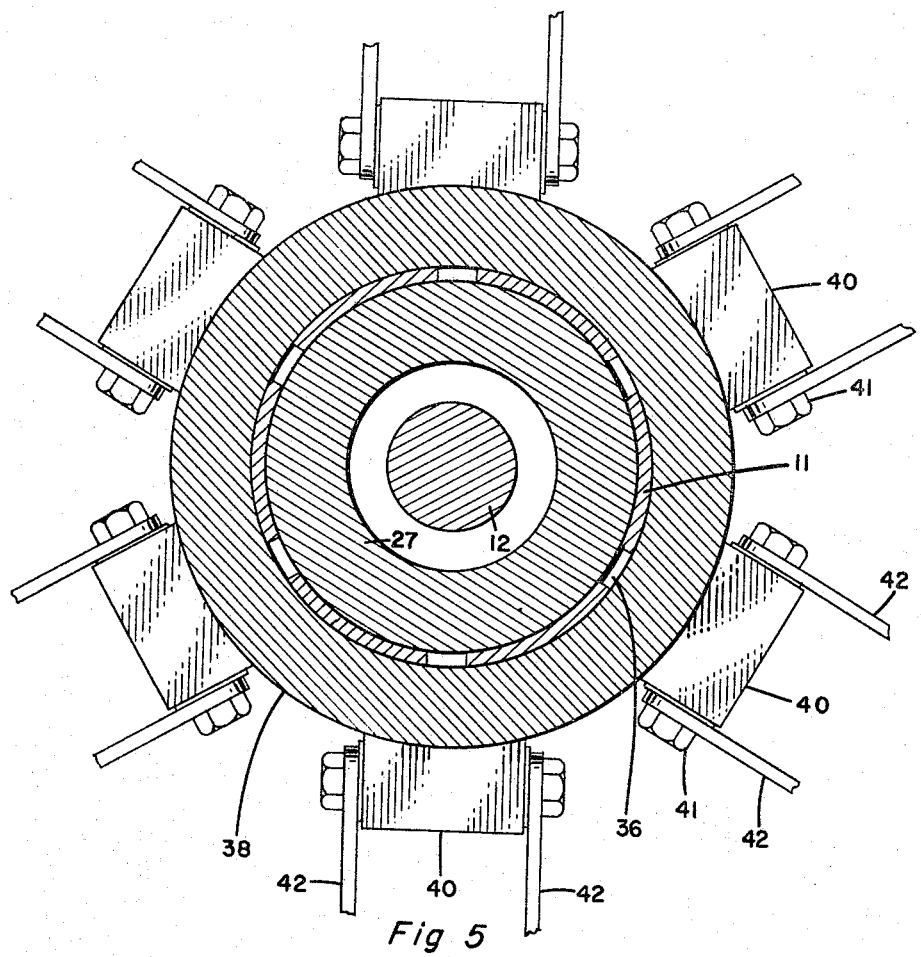
FIGURE 5 is an enlarged detailed fragmentary view, partly in cross-section, of the upper linkage actuating collar of FIGURE 4.

In order that the bag 67 will be maintained in the position shown in FIGURES 1 and 2, an elastic cord 70 is looped over each of the spacers 61 for the upper linkage assembly, and snap hooks 71 on the opposite ends of the cords 70 are connected to the rings 68 most adjacent thereto.

The member 17 is then connected by bolts 16 to the plug 14 and the handwheel 13 is placed on and keyed to the free end of the rod 12 and the sliver inserter is ready to apply inert slivers A to the interior of a motor case.

The inert slivers A are connected to the studs 65 on the linkage arms 42 and 56, adhesive is applied to that surface of the inert sliver A that is to contact the interior of the motor case, and the entire assembly is then lowered into a motor case.

The handwheel 13 is rotated until the inert slivers are in position, and then compressed air is admitted into the bag 67 to apply even pressure to the inert slivers A over their entire length to properly bond them into position, as shown in FIGURE 2.

A supply hose, not shown, extends from the valve 69 to the outlet coupling of an air gauge 72 mounted on the member 17; and another air hose, not shown, is connected to the inlet coupling of the air gauge 72—the latter air hose being connected to a suitable source of supply of compressed air. A control valve 73 of any suitable configuration may be positioned in the inlet coupling of the air gauge 72 forwardly thereof.

The sliver inserter 10 is retained in the motor case until the inert slivers are rigidly bonded in place at which time the bag 67 is deflated and the handwheel is manipulated to withdraw the studs 65 from the openings in the inert sliver A, the air bleeding into the openings serving to apply reverse pressure and aiding in effecting release of the inert sliver A from the studs 65. Upon release of the inert sliver A from the studs 65, the sliver inserter is returned to the position shown in FIGURE 1 at which time it may be withdrawn from the motor case.

There has thus been provided a sliver inserter that will meet the requirements for which it has been designed; and it is believed that, from the foregoing description, the structure and manner of use of the sliver inserter will be apparent to those skilled in the art, it also being understood that changes may be made in the details of the sliver inserter provided such changes fall within the spirit of the invention and the scope of the appended claims.

Having thus described the invention, what is claimed is new and desired to be secured by Letters Patent is:

1. A sliver inserter for placing inert slivers in the motor cases of solid propellant rocket motors comprising a tubular body member, actuating means positioned in said body member, followers in said body member coacting with said actuating means, a plurality of collars slidably mounted on said body member, certain of said collars being connected to said followers and certain of said collars being fixed to said body member, linkage means connected to said collars and to each other, an inflatable bag positioned on said body member in circumjacent relation thereto and intermediate of said linkage means, and means on the outer ends of said linkage means, for connecting an inert sliver thereto.

2. A sliver inserter for placing inert slivers in motor cases for solid propellant rocket motors comprising a tubular body member, expandable means mounted on said body member for holding the inert slivers and moving them into contact with the interior surface of said motor case and an inflatable bag member on said body member that when inflated will apply pressure over the entire length of the inert slivers to retain the slivers in position until adhesive applied thereto has bonded the inert slivers to said motor case.

3. A sliver inserter, as in claim 2, wherein said expandable means comprises an actuating rod, a plurality of collars slidably mounted on said body member, certain of said collars being connected to said actuating rod and certain of said collars being connected to said body member and linkage means connected to said collars and to each other.

4. A sliver inserter, as in claim 3, wherein the outer ends of said linkage means has means thereon for connecting the inert slivers thereto.

5. A sliver inserter, as in claim 2, wherein supporting means are detachably connected to one end of said body member for supporting said body member in said motor case in axial alignment therewith.

6. A sliver inserter, as in claim 2, wherein tie means are provided for connecting said inflatable bag member to said expandable means for retaining said inflatable bag member in extended position in said motor case.

References Cited

UNITED STATES PATENTS

| 284,641 | 9/1883 | Klein | 269—48.1 |
|---|---|---|---|
| 2,323,039 | 6/1943 | Hill | 269—48.1 |
| 2,942,645 | 6/1960 | Edwards | 156—423 |
| 2,987,882 | 6/1961 | Nocke | 102—98 X |
| 3,080,269 | 3/1963 | Pollock et al. | 156—423 X |

EARL M. BERGERT, *Primary Examiner.*

J. P. MELOCHE, *Assistant Examiner.*